(12) United States Patent
Minz (10) Patent No.: US 7,475,105 B2
(45) Date of Patent: Jan. 6, 2009

(54) ONE BIT FULL ADDER WITH SUM AND CARRY OUTPUTS CAPABLE OF INDEPENDENT FUNCTIONALITIES

(75) Inventor: Deboleena Minz, New Delhi (IN)

(73) Assignee: STMicroelectronics Pvt. Ltd., Uttar Pradesh (IN)

( * ) Notice: Subject to any disclaimer, the term of this patent is extended or adjusted under 35 U.S.C. 154(b) by 773 days.

(21) Appl. No.: 11/152,954

(22) Filed: Jun. 15, 2005

(65) Prior Publication Data
US 2005/0289211 A1 Dec. 29, 2005

(30) Foreign Application Priority Data
Jun. 17, 2004 (IN) .................. 1143/DEL/2004

(51) Int. Cl.
*G06F 7/50* (2006.01)
(52) U.S. Cl. ...................................... 708/700
(58) Field of Classification Search ............... None
See application file for complete search history.

(56) References Cited
U.S. PATENT DOCUMENTS

| | | | |
|---|---|---|---|
| 5,546,018 A | 8/1996 | New et al. | 326/38 |
| 5,724,276 A * | 3/1998 | Rose et al. | 708/235 |
| 5,761,099 A | 6/1998 | Pedersen | 364/716.01 |
| 6,236,677 B1 * | 5/2001 | Hsieh | 375/222 |
| 6,353,920 B1 | 3/2002 | Wittig et al. | 716/16 |
| 7,164,290 B2 * | 1/2007 | Schlacter | 326/40 |
| 2005/0275428 A1 * | 12/2005 | Schlacter | 326/41 |

* cited by examiner

*Primary Examiner*—Tan V Mai
(74) *Attorney, Agent, or Firm*—Lisa K. Jorgenson; Allen, Dyer, Doppelt, Milbrath & Gilchrist, P.A.

(57) ABSTRACT

A one bit full adder with sum and carry outputs performs independent functions. The full adder includes at least one look up table (LUT) for implementing a sum function, and at least one carry circuit for implementing a carry/borrow function. The carry circuit includes a first multiplexer having first and second inputs, a select line input, and a carry/borrow output. The carry circuit also includes an AND gate, an OR gate and an XOR gate. The AND gate has two inputs, and an output connected to the first input of the first multiplexer. The OR gate has two inputs, and an output connected to the second input of the first multiplexer. The XOR gate has a first input, and an output connected to the select line input of the first multiplexer. A second multiplexer has an output connected to the first input of the XOR gate. The at least one LUT and the at least one carry circuit provides independent sum and carry outputs for different function requirements.

20 Claims, 6 Drawing Sheets

ONE BIT FULL ADDER WITH SUM AND CARRY OUTPUTS CAPABLE OF INDEPENDENT FUNCTIONALITIES

FIELD OF THE INVENTION

The present invention provides a one bit full adder with sum and carry outputs for performing independent functions. In one embodiment, the carry circuit is used for addition and subtraction operations, and also for AND and OR chains. In another embodiment, the carry circuit is used as a sum of product (SOP) chain.

BACKGROUND OF THE INVENTION

Figure 1:
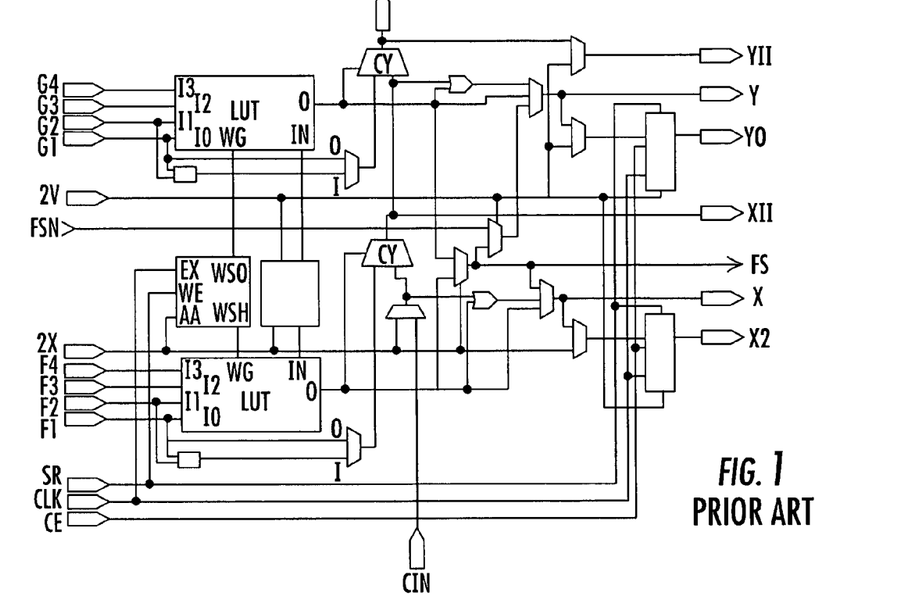
FIG. 1 illustrates a configurable logic block (CLB) of a conventional PLD according to the prior art.

A full adder is one of the basic circuits used in various architectures. Different techniques have been employed in these architectures to implement carry propagation in an adder chain. FIG. 1 illustrates a configurable logic block (CLB) of a conventional PLD made by Xilinx, Inc. This CLB is described in more detail in U.S. Pat. No. 5,546,018. As shown, the Xilinx CLB includes four four-input function generators F, G, H, J each comprising look up tables for implementing one bit of an arithmetic function of two variables which are received on the input terminals 0,1,2,3 of each function generator. A one-bit addition of two variables can be performed by using the carry multiplexer for the carry bit and the exclusive OR gate for the sum bit.

Figure 2:
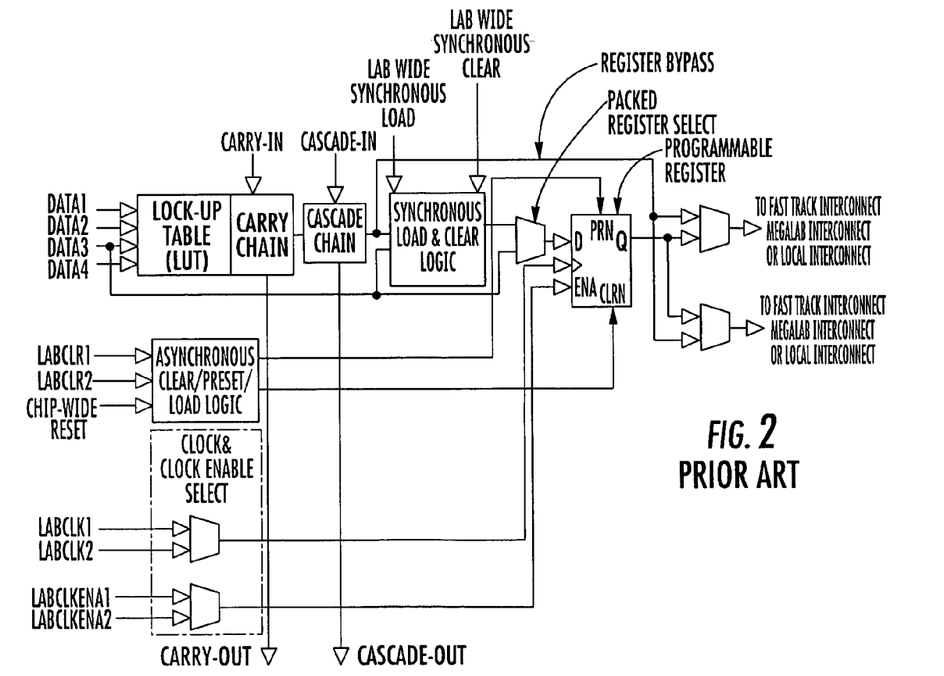
FIG. 2 illustrates a logic array block of a conventional PLD according to the prior art.

FIG. 2 illustrates a logic array block of a conventional PLD made by Altera, Inc. This LAB is described in more detail in U.S. Pat. No. 5,761,099. This device also comprises a four-input look up table, which can be configured to perform one bit of an arithmetic operation of two input variables. A one-bit addition of two variables, along with the carry, can be performed in the LUT.

The carry circuit in the Xilinx PLD can be utilized to implement functions such as AND, OR, XNOR, etc. as described in U.S. Pat. No. 6,353,920. However, the carry circuit cannot be used in isolation. The carry circuit has to be used along with the LUT for the implementation of each of the functions. Furthermore, both of the architectures use a four-input LUT (and some carry circuitry) to generate a sum and a carry bit.

SUMMARY OF THE INVENTION

An object of the present invention is to implement a one-bit addition of two variables in a three input LUT and a carry circuit.

Another object of the present invention is to implement functions such as AND and OR gates in the carry circuit, irrespective of the function implemented in the three input LUT.

The present invention thus provides a one bit full adder with sum and carry outputs capable of independent functions. The three-input LUT and the carry circuit may be used together or independently. The LUT that may be used with a multi-purpose carry chain to implement a sum of product (SOP) operation.

The carry circuit may be independently used for an arithmetic subfunction. A multi purpose carry circuit provides greater flexibility to the configurable logic block (CLB) structure and also allows for better packaging.

This advantageously reduces extra hardware required for the generation of the sum bit.

To achieve the above objects, the present invention provides a one bit full adder with sum and carry outputs capable of independent functionalities comprising a three input LUT for implementing a sum function, and a carry circuit for implementing a carry/borrow function. The carry circuit comprises a first multiplexer having two inputs and carry/borrow output, an AND gate receiving two inputs with its output connected to the first multiplexer, an OR gate receiving two inputs with its output connected to the first multiplexer, an XOR gate having its output connected to a select line of the first multiplexer, and a second multiplexer connected to one of the inputs of the XOR gate.

The arrangement between the LUT and carry circuit may be such that either it provides independent sum and carry outputs for different functionality requirements, or the carry output is connected to the input of another LUT and carry circuit for a subsequent bit addition.

A multiplexer may be connected to one of the inputs of the LUT to provide third input to the LUT. The carry circuit can be configured as an AND chain, an OR chain or sum a of product output by changing the configuration bit of the second multiplexer and the input bit of the XOR gate.

The LUT can be configured for a sum/difference output and three other input functions by selecting an input from the multiplexer connected to the LUT. The carry circuit may be dynamically configured as an AND or an OR gate by programming the a/s bit.

BRIEF DESCRIPTION OF THE DRAWINGS

The invention will now be described with reference to the accompanying drawings.

DETAILED DESCRIPTION OF THE PREFERRED EMBODIMENTS

In arithmetic logic, the equations representing a one bit full addition operation are:

$$Y = A \oplus B \oplus Cin \quad\quad\quad 1(A)$$

$$Cout = [A \, (B \, OR \, Cin)] \, OR \, [\sim A \, (B \, AND \, Cin)] \quad\quad\quad 1(B)$$

where A and B are two single-bit inputs, Cin is the carry generated by the previous stage, Y is the sum output and Cout is the carry generated during the addition operation.

$$Y = A \oplus B \oplus Cin \quad\quad\quad 2(A)$$

$$Cout = [\sim A \, (B \, OR \, Cin)] \, OR \, [A \, (B \, AND \, Cin)] \quad\quad\quad 2(B)$$

Equations 2(A) and 2(B) represent logic equations of the subtraction operation where A and B are two single-bit inputs, Cin is the borrow generated by the previous stage, Y is the difference output and Cout is the borrow output generated during the subtraction operation.

Figure 3A:
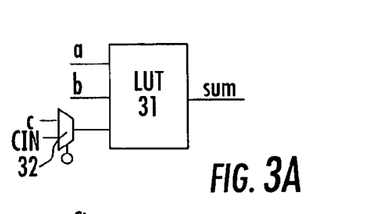
FIG. 3A is a block diagram of a three-input LUT in accordance with the present invention.
Figure 3B:
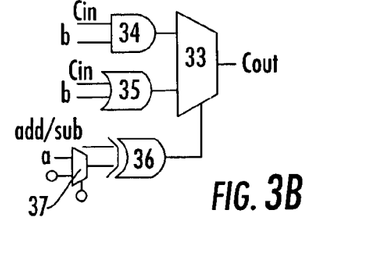
FIG. 3B is a block diagram of a carry circuit in accordance with the present invention.

FIGS. 3A and 3B describe the architecture for addition/subtraction operations to be implemented in accordance with the present invention. FIG. 3A illustrates a three input LUT 31 with a two input multiplexer 32 connected to one of the three inputs. The logic equation for a sum/difference output of an addition/subtraction is common. The LUT 31 is used to implement this sum/difference output of addition/subtraction operations. It therefore provides the XORed output of the three input variables. The inputs of the multiplexer 32 give the user options to either use a previous carry or a new input for the operation to be performed using the LUT 31.

FIG. 3B is used to implement the carry/borrow function of an addition/subtraction operation. This circuit comprises a two input multiplexer 33 with an AND gate 34 connected to one input while an OR gate 35 is connected to the other input. The select line of the multiplexer 33 receives the bit value via an XOR gate 36 having the multiplexer 37 connected to one of its inputs.

In the above equations, the addition and subtraction operations have a different Cout. Depending upon the bit value of the add/sub input applied at the input of the XOR gate 36, an addition or subtraction operation is performed. A bit value '0' on the add/sub signal denotes an addition operation while a bit value '1' denotes a subtraction operation. The other input of the XOR gate 36 depends upon the output of the multiplexer 37.

The multiplexer 37 outputs a value depending upon the configuration bit that acts as a select bit. When the add/sub='0' the output of the multiplexer 37 passes to the output of the XOR gate 36, which then acts as a select bit for the multiplexer 33, and thus provides an output to Cout.

Similarly, when the add/sub='1', a complement of the value present at the output of the multiplexer 37 or the second input of the XOR gate 36 is transferred to the select line of the multiplexer 33 which then selects the desired Cout. In this way the circuit generates a Cout signal.

Figure 3C:
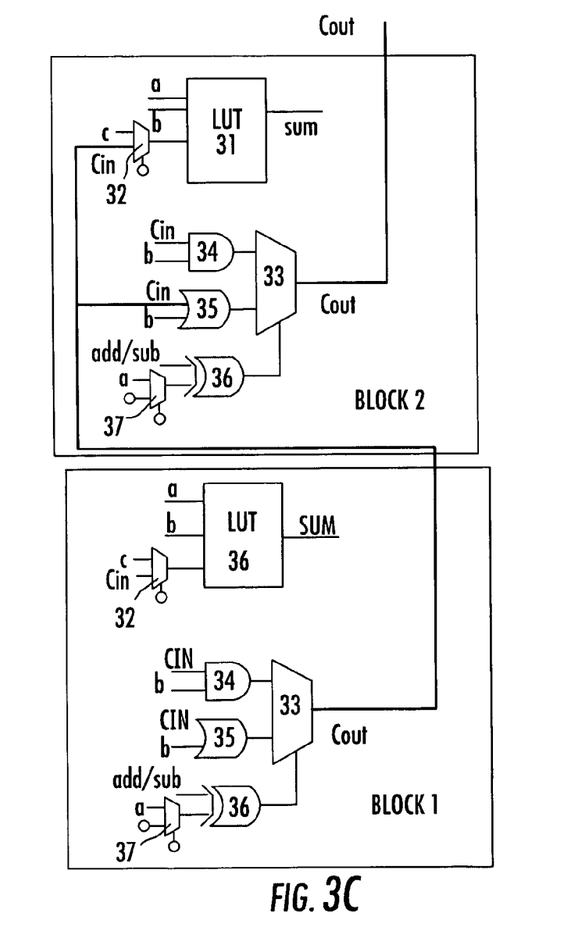
FIG. 3C is a block diagram of a two or more bit addition/subtraction circuit in accordance with the present invention.

FIG. 3C represents the addition/subtraction of two or more bits with the carry bit of the first block connected to the carry input of the second block, and so on. The number of blocks cascaded depends upon the number of bits to be added/subtracted with the carry out of the first block connected to the carry in the second block.

In another embodiment of the present invention, the carry circuit is utilized for implementing an AND/OR chain while the LUT is utilized for any desired three input function. To utilize the carry circuit as an AND/OR chain, '0' is written on the add/sub signal.

Figure 4A:
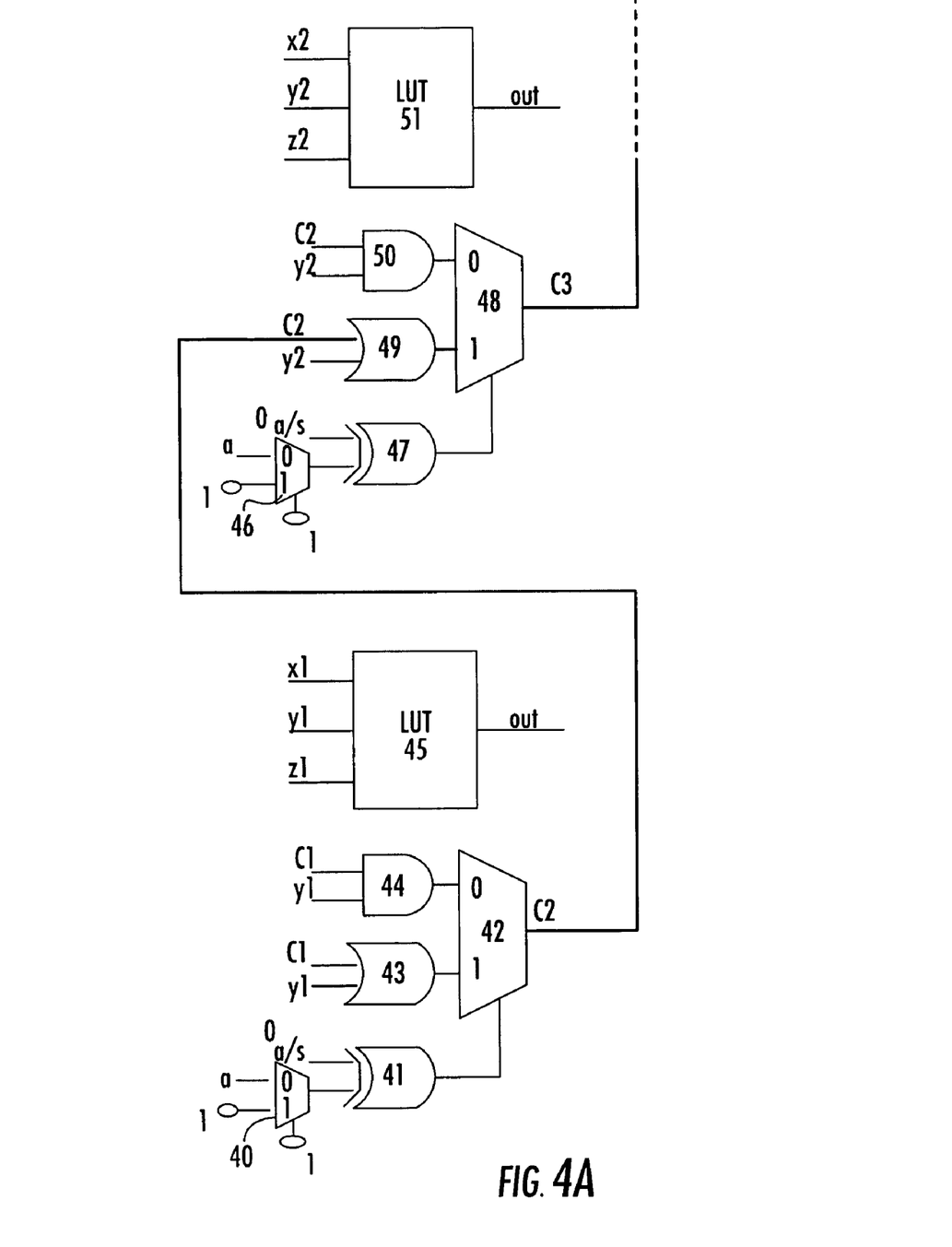
FIG. 4A is a block diagram of a carry circuit in accordance with the present invention implementing an OR chain.

The implementation of the OR chain utilizing the carry circuit is depicted in FIG. 4A. The select bit and one input of the multiplexer 40 are programmed with a bit value '1' while the second input of the multiplexer 40 is user programmable. The output of the multiplexer 40 is connected to the input of the XOR gate 41, which acts as a select bit for the multiplexer 42 having a bit value '1'. The select bit of the multiplexer 42 selects the OR gate 43 connected to one of the inputs of the multiplexer 42. The output of the multiplexer 42 is connected to the input of the OR gate 49, thus the OR gates 43, 49 and are connected to form a chain.

The OR gate 49 is in turn selected by the second carry circuit to propagate the carry chain. The final Cout is thereby received after a desired number of OR operations.

Figure 4B:
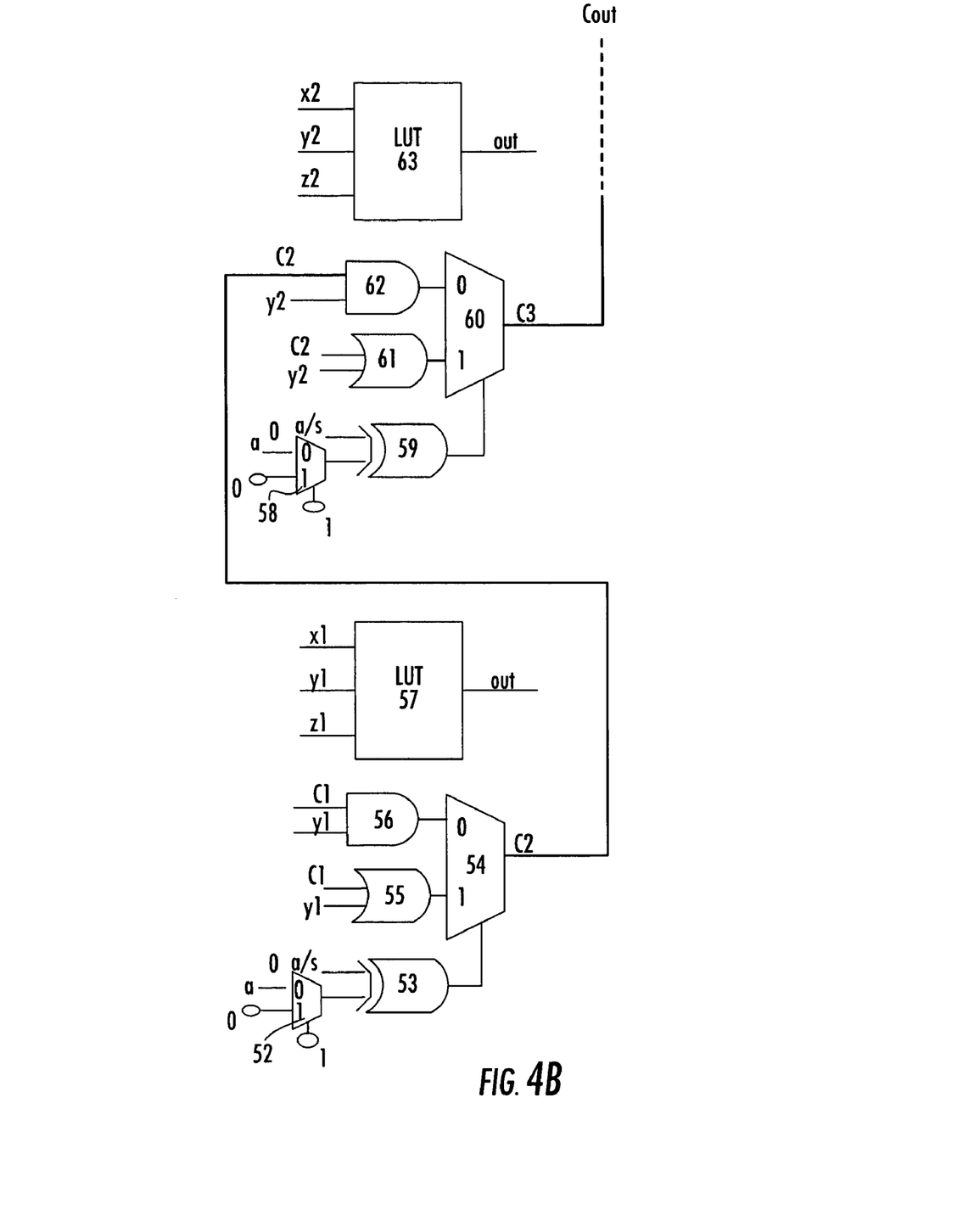
FIG. 4B is a block diagram of a carry circuit in accordance with the present invention implementing an AND chain.

Similarly, FIG. 4B describes the AND chain. The select bit and one of the inputs of the multiplexer 52 is made '1' and '0', respectively, while the second input of the multiplexer 52 is user programmable. Thus, the select bit selects the configuration bit at the second input of the multiplexer 52. The output of the multiplexer 52 with the input bit values is '0'. The two inputs of the XOR gate 53 thus become '0', thereby outputting a bit value '0'. The bit value acts as a select bit for the multiplexer 54. This thereby selects the output of the AND gate 56 at the output multiplexer 54. The output of the multiplexer 54 is transferred to the input of the AND gate 62, thus the AND gates 56, 62 are connected to form an AND chain. Meanwhile, the three input LUTs 57, 63 can be used for different three input functions.

Figure 5A:
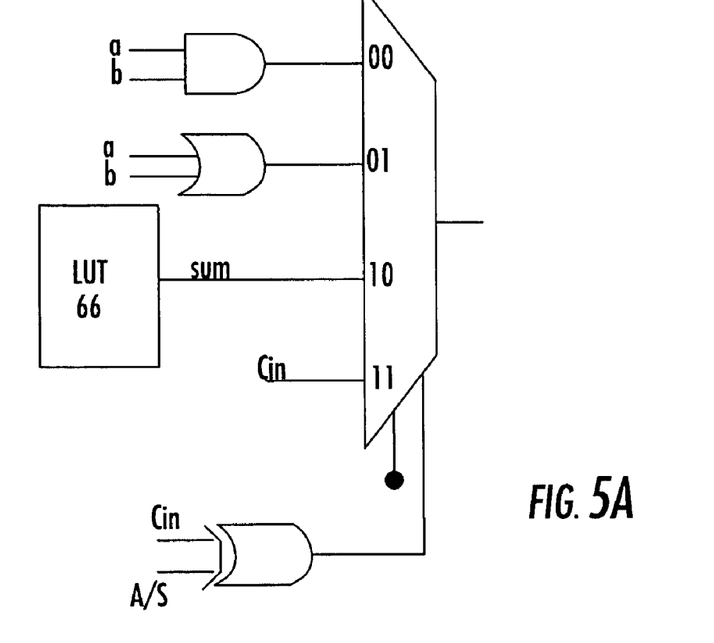
FIG. 5A is a block diagram of a carry circuit and LUT in accordance with the present invention used in implementing an AND chain, an OR chain or an SOP chain.

FIGS. 5A, 5B, 5C and 5D show another embodiment of the invention. FIG. 5A disclose a four input multiplexer 68 with an AND gate 64, an OR gate 65, a three input LUT 66 and a Cin signal connected to each of the four inputs by way of an XOR gate 67 connected to one of the select line of the four input multiplexer 68 while the other select line of the multiplexer 68 is controlled by configuration bit. This architecture can be used to implement the function as described in FIGS. 3A, 3B, 4A and 4B and also to achieve a sum of products at the output of the multiplexer 68. This is described in detail in the following explanation.

Figure 5B:
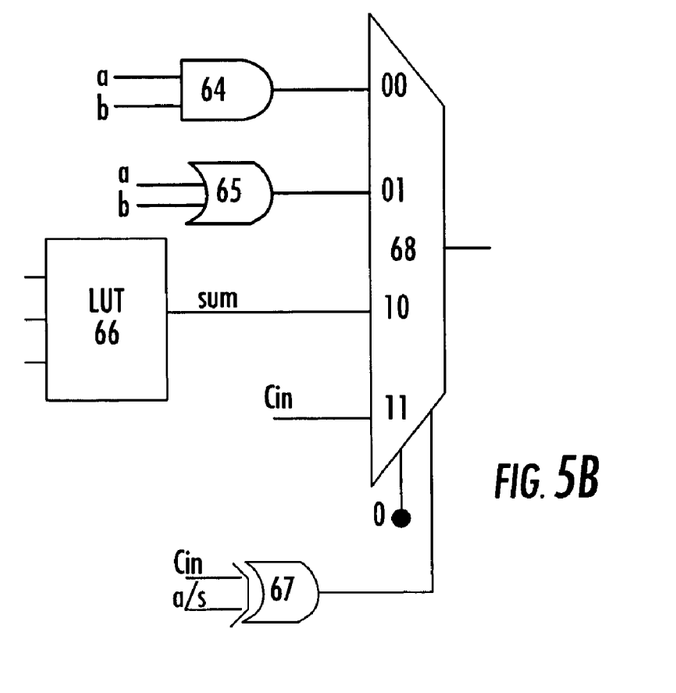
FIG. 5B is a block diagram of a carry circuit and LUT in accordance with the present invention used for implementing a carry chain.

In FIG. 5B, CB='0'. This enables the multiplexer 68 to implement a carry function as discussed in FIGS. 3B, 4A and 4B with the suitable bit values as the output of the multiplexer 68 receives input from either the AND gate 64 or the OR gate 65.

Figure 5C:
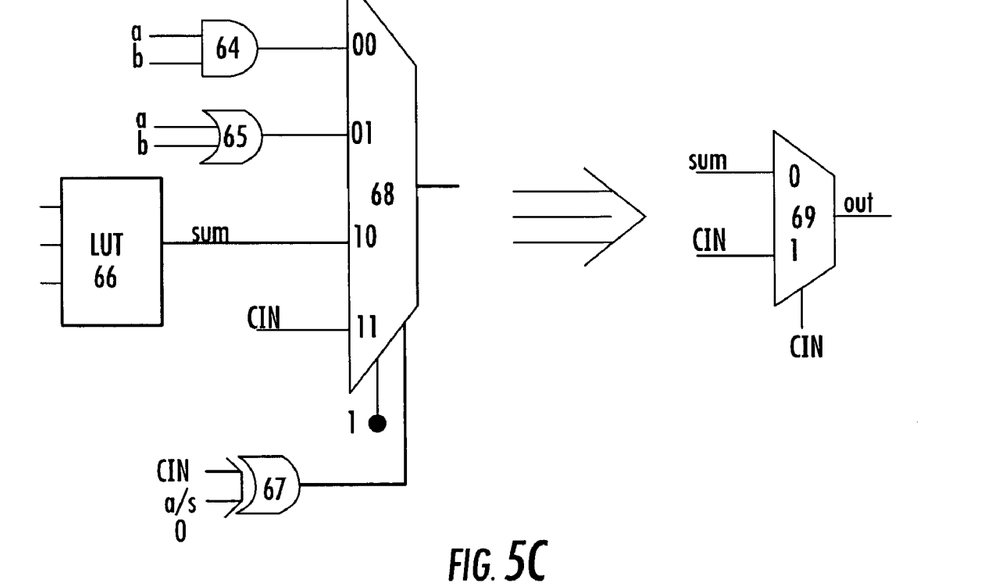
FIGS. 5C and 5D are block diagrams of a carry circuit and LUT and their equivalent circuit diagrams for implementing other embodiments in accordance with the present invention.
Figure 5D:
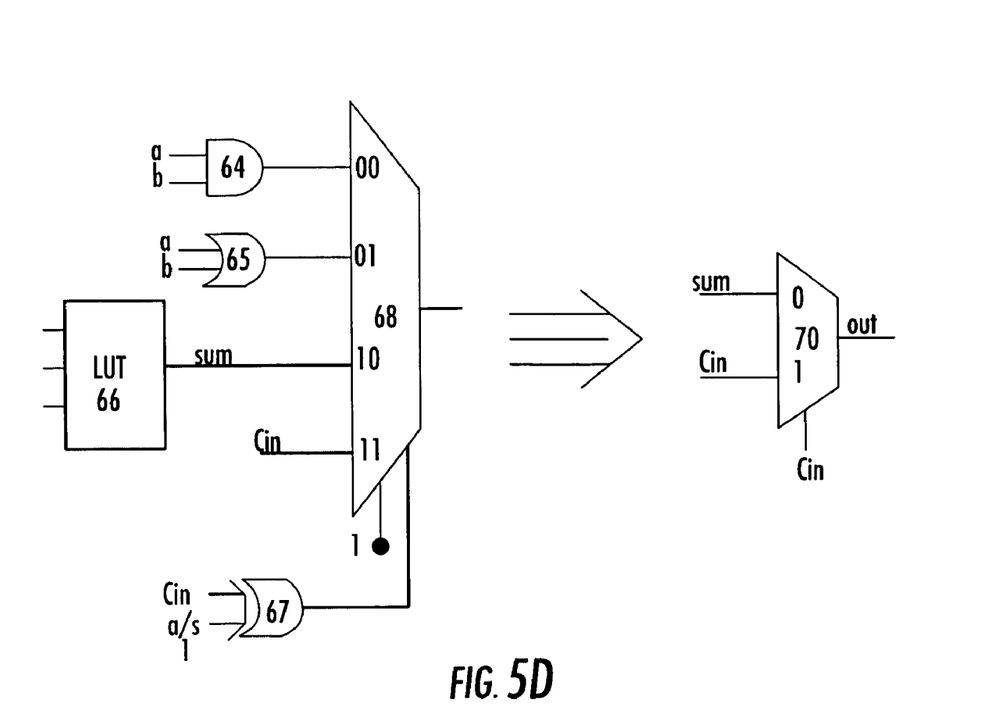

In FIGS. 5C and 5D, CB='1'. This means that only the lower two inputs of the multiplexer 68 can be selected depending upon the bit value of a/s signal.

In FIG. 5C, the bit value of the a/s signal is '0', thereby outputting the input bit vector Cin at the output of the XOR 67 gate. This bit acts as one of the select bits of the multiplexer 68 enabling the multiplexer to function as an OR gate. To the right of the arrow in FIG. 5C is the equivalent circuit functioning as an OR gate. The multiplexer 69 receives Cin as one of its input as well as its select line, while the other input receives the sum output corresponds to the lower two inputs. The multiplexer 69 thus functions as an AND gate outputting bit '1' when any or both of the inputs are '1'.

In FIG. 5D, the bit value of the a/s signal is '1', thereby outputting the inverted value of the input bit vector Cin at the output of the XOR 67 gate. This bit acts as one of the select bits of the multiplexer 68 enabling the multiplexer to function as an AND gate. To the right of the arrow in FIG>5D is the equivalent circuit of FIG. 5C functioning as an AND gate. The multiplexer 70 receives Cin as one of its input with the inverted value of Cin connected to the select line, and the other input connected to the sum output corresponds to the lower two inputs. The multiplexer 70 thus functions as an AND gate outputting bit '1' only when both the inputs are '1'.

Since the a/s signal is a user input, the above mentioned carry circuit can be dynamically configured as an AND or an OR gate.

That which is claimed is:

1. A one bit full adder with sum and carry outputs for performing independent functions comprising:
at least one three-input look up table (LUT) for implementing a sum function; and
at least one carry circuit for implementing a carry/borrow function comprising
a first multiplexer having first and second inputs, a select line input, and a carry/borrow output,
an AND gate having two inputs, and an output connected to the first input of said first multiplexer,
an OR gate having two inputs, and an output connected to the second input of said first multiplexer,
an XOR gate having a first input, and an output connected to the select line input of said first multiplexer, and a second multiplexer having an output connected to the first input of said XOR gate, said at least one LUT and said at least one carry circuit for providing independent sum and carry outputs for different function requirements.

2. A one bit full adder according to claim 1 wherein said at least one three-input LUT comprises first and second LUTs; wherein said at least one carry circuit comprises first and second carry circuits; and wherein a carry output of said first multiplexer of said first carry circuit is connected to inputs of said second LUT and said second carry circuit for a subsequent bit addition.

3. A one bit full adder according to claim 1 wherein each LUT has first, second and third inputs; and further comprising a third multiplexer connected to the third input of said LUT.

4. A one bit full adder according to claim 3 wherein said LUT can be configured for a sum/difference output, and for three other input functions based upon selecting an input of said third multiplexer connected to said LUT.

5. A one bit full adder according to claim 1 wherein said XOR gate has a second input for receiving an input bit; wherein said second multiplexer has a configuration input for receiving a configuration bit; and wherein said at least one carry circuit comprises a plurality of carry circuits connected together and configured as an AND chain, an OR chain or a sum of product output based upon the configuration bit and the input bit.

6. A one bit full adder according to claim 1 wherein said XOR gate has a second input for receiving an add/subtract bit; and wherein said at least one carry circuit is dynamically configured as an AND gate or an OR gate based upon programming of the add/subtract bit.

7. A full adder comprising:
at least one look up table (LUT) for implementing a sum function; and
at least one carry circuit for implementing a carry/borrow function comprising
a first multiplexer having first and second inputs, a select line input, and a carry/borrow output,
a first logic gate having two inputs, and an output connected to the first input of said first multiplexer,
a second logic gate having two inputs, and an output connected to the second input of said first multiplexer,
a third logic gate having a first input, and an output connected to the select line input of said first multiplexer, and
a second multiplexer having an output connected to the first input of said third logic gate,
said at least one LUT and said at least one carry circuit for providing independent sum and carry outputs for different function requirements.

8. A full adder according to claim 7 wherein said first logic gate comprises an AND gate, said second logic gate comprises an OR gate, and said third logic gate comprises an XOR gate.

9. A full adder according to claim 7 wherein said at least LUT comprises first and second LUTs; wherein said at least one carry circuit comprises first and second carry circuits; and wherein a carry output of said first multiplexer of said first carry circuit is connected to inputs of said second LUT and said second carry circuit for a subsequent bit addition.

10. A full adder according to claim 7 wherein each LUT has first, second and third inputs; and further comprising a third multiplexer connected to the third input of said LUT.

11. A full adder according to claim 10 wherein said LUT can be configured for a sum/difference output, and for three other input functions based upon selecting an input of said third multiplexer connected to said LUT.

12. A full adder according to claim 7 wherein said third logic gate has a second input for receiving an input bit; wherein said second multiplexer has a configuration input for receiving a configuration bit; and wherein said at least one carry circuit comprises a plurality of carry circuits connected together and configured as an AND chain, an OR chain or a sum of product output based upon the configuration bit and the input bit.

13. A full adder according to claim 7 wherein said third logic gate has a second input for receiving an add/subtract bit; and wherein said at least one carry circuit is dynamically configured as an AND gate or an OR gate based upon programming of the add/subtract bit.

14. A method for making a full adder comprising:
providing at least one look up table (LUT) for implementing a sum function; and
providing at least one carry circuit for implementing a carry/borrow function comprising
a first multiplexer having first and second inputs, a select line input, and a carry/borrow output,
a first logic gate having two inputs, and an output connected to the first input of the first multiplexer,
a second logic gate having two inputs, and an output connected to the second input of the first multiplexer,
a third logic gate having a first input, and an output connected to the select line input of the first multiplexer, and
a second multiplexer having an output connected to the first input of the third logic gate,
the at least one LUT and the at least one carry circuit providing independent sum and carry outputs for different function requirements.

15. A method according to claim 14 wherein the first logic gate comprises an AND gate, the second logic gate comprises an OR gate, and the third logic gate comprises an XOR gate.

16. A method according to claim 14 wherein the at least LUT comprises first and second LUTs; wherein the at least one carry circuit comprises first and second carry circuits; and wherein a carry output of the first multiplexer of the first carry circuit is connected to inputs of the second LUT and the second carry circuit for a subsequent bit addition.

17. A method according to claim 14 wherein each LUT has first, second and third inputs; and further comprising providing a third multiplexer connected to the third input of the LUT.

18. A method according to claim 17 wherein the LUT can be configured for a sum/difference output, and for three other input functions based upon selecting an input of the third multiplexer connected to the LUT.

19. A method according to claim 14 wherein the third logic gate has a second input for receiving an input bit; wherein the second multiplexer has a configuration input for receiving a configuration bit; and wherein said at least one carry circuit comprises a plurality of carry circuits connected together and configured as an AND chain, an OR chain or a sum of product output based upon the configuration bit and the input bit.

20. A method according to claim 14 wherein the third logic gate has a second input for receiving an add/subtract bit; and wherein the at least one carry circuit is dynamically configured as an AND gate or an OR gate based upon programming of the add/subtract bit.

* * * * *

UNITED STATES PATENT AND TRADEMARK OFFICE
CERTIFICATE OF CORRECTION

PATENT NO. : 7,475,105 B2  Page 1 of 1
APPLICATION NO. : 11/152954
DATED : January 6, 2009
INVENTOR(S) : Deboleena Minz It is certified that error appears in the above-identified patent and that said Letters Patent is hereby corrected as shown below:

| | |
|---|---|
| Column 1, Line 12 | Delete: "product"<br>Insert: --the product-- |
| Column 2, Line 14 | Delete: "provide third"<br>Insert: --provide a third-- |
| Column 2, Line 15 | Delete: "sum a"<br>Insert: --a sum-- |
| Column 4, Line 12 | Delete: "disclose"<br>Insert: --discloses-- |
| Column 4, Line 17 | Delete: "by configuration"<br>Insert: --by a configuration-- |
| Column 4, Line 34 | Delete: "input"<br>Insert: --inputs-- |
| Column 4, Line 35 | Delete: "output"<br>Insert: --output which-- |
| Column 4, Line 44 | Delete: "input"<br>Insert: --inputs-- |
| Claim 16<br>Column 6, Line 39 | Delete: "at least"<br>Insert: --at least one-- |

Signed and Sealed this

Twenty-sixth Day of May, 2009

JOHN DOLL
*Acting Director of the United States Patent and Trademark Office*